US012766902B2

(12) United States Patent
Yu et al.

(10) Patent No.: US 12,766,902 B2
(45) Date of Patent: Oct. 20, 2026

(54) DRIVING DEVICE

(71) Applicants: Hyundai Motor Company, Seoul (KR); Kia Corporation, Seoul (KR)

(72) Inventors: Geun Sang Yu, Gunpo-si (KR); Ho Seong Kang, Seoul (KR); Jun Hwan Park, Seoul (KR); Hun Keon Ko, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 441 days.

(21) Appl. No.: 18/385,592

(22) Filed: Oct. 31, 2023

(65) Prior Publication Data

US 2024/0383290 A1 Nov. 21, 2024

(30) Foreign Application Priority Data

May 15, 2023 (KR) ........................ 10-2023-0062641

(51) Int. Cl.

| | |
|---|---|
| ***B60K 7/00*** | (2006.01) |
| ***B60G 3/01*** | (2006.01) |
| ***B60G 3/02*** | (2006.01) |
| ***B60G 13/02*** | (2006.01) |
| ***B60G 13/16*** | (2006.01) |

(52) U.S. Cl.
CPC .............. *B60G 3/02* (2013.01); *B60K 7/0007* (2013.01); *B60G 2206/124* (2013.01)

(58) Field of Classification Search
CPC ....... B60K 7/00–0023; B60K 2007/003–0092; B60G 3/02; B60G 2206/124; B60G 2200/156; B60G 2204/30
See application file for complete search history.

(56) References Cited

U.S. PATENT DOCUMENTS

| | | | | |
|---|---|---|---|---|
| 6,257,604 | B1 * | 7/2001 | Laurent | B60G 17/0157 267/68 |
| 7,320,376 | B2 | 1/2008 | Kurata | |
| 7,347,295 | B2 | 3/2008 | Kurata | |
| 7,699,326 | B2 * | 4/2010 | Yamada | B60G 7/008 280/124.125 |
| 8,409,042 | B2 | 4/2013 | Yang | |
| 10,946,706 | B2 * | 3/2021 | Sardes | B60G 3/185 |
| 11,524,538 | B2 * | 12/2022 | Sardes | B60G 3/207 |

(Continued)

FOREIGN PATENT DOCUMENTS

| | | |
|---|---|---|
| JP | 4311139 B2 | 8/2009 |
| JP | 4737408 B2 | 8/2011 |

(Continued)

*Primary Examiner* — Tinh T Dang
(74) *Attorney, Agent, or Firm* — Banner & Witcoff, Ltd.

(57) ABSTRACT

A driving device includes a wheel part with a wheel frame, and a wheel driving unit disposed at a center of the wheel frame to be able to rotate the wheel frame, an eccentric part connecting a vehicle body to the wheel part, and a suspension coupled to the wheel part and to the eccentric part. The suspension is configured to provide an elastic force to damp an impact between the vehicle body and the wheel body. The eccentric part includes an eccentric center having a rotation center being eccentric from a rotation axis of the wheel part, and an eccentric link extending from the eccentric center. The eccentric link is rotatable about the rotation axis of the wheel frame.

12 Claims, 8 Drawing Sheets

(56) References Cited

U.S. PATENT DOCUMENTS

| | | | | |
|---|---|---|---|---|
| 2003/0183034 | A1 * | 10/2003 | Yang | B65G 23/08 74/421 A |
| 2005/0056471 | A1 | 3/2005 | Kurata | |
| 2006/0012144 | A1 * | 1/2006 | Kunzler | B60G 3/01 280/124.125 |
| 2007/0039771 | A1 | 2/2007 | Kurata | |
| 2007/0272458 | A1 * | 11/2007 | Taniguchi | B60G 11/00 180/348 |
| 2008/0000706 | A1 * | 1/2008 | Tashiro | F16D 3/56 464/83 |
| 2011/0072926 | A1 | 3/2011 | Yang | |
| 2014/0034198 | A1 * | 2/2014 | Wichern | B60B 9/06 152/18 |
| 2016/0068016 | A1 * | 3/2016 | Winshtein | B60B 9/24 301/6.5 |
| 2022/0266669 | A1 | 8/2022 | Yu et al. | |
| 2022/0297487 | A1 * | 9/2022 | Sardes | B62D 7/08 |

FOREIGN PATENT DOCUMENTS

| | | | |
|---|---|---|---|
| KR | 101897274 | B1 | 9/2018 |
| KR | 10-2022-0121078 | A | 8/2022 |

* cited by examiner

DRIVING DEVICE

CROSS-REFERENCE TO RELATED APPLICATION

This application claims the benefit of priority to Korean Patent Application No. 10-2023-0062641, filed in the Korean Intellectual Property Office on May 15, 2023, the entire contents of which are incorporated herein by reference.

TECHNICAL FIELD

The present disclosure relates to a driving device.

BACKGROUND

Demand for electric vehicles and/or hybrid vehicles that use electric motors as power sources and vehicles equipped with autonomous driving functions has increased. Vehicles are used in various fields, such as object delivery and/or people and/or cargo transportation fields.

A suspension may have difficulty variably coping with impacts that occur according to driving environments of the vehicles, such as road surface environments.

SUMMARY

The following summary presents a simplified summary of certain features. The summary is not an extensive overview and is not intended to identify key or critical elements.

Systems, apparatuses, and methods are described for a driving device. A driving device comprises a wheel part comprising a wheel frame; a wheel driving unit, at a center of the wheel frame, configured to rotate the wheel frame; an eccentric part configured to connect a vehicle body to the wheel part; and a suspension coupled to the wheel part and to the eccentric part. The suspension is configured to provide an elastic force to damp an impact between the vehicle body and the wheel part. The eccentric part comprises an eccentric center comprising a rotation axis parallel to and eccentric from a rotation axis of the wheel part; and an eccentric link extending from the eccentric center and configured to rotate about the rotation axis of the wheel part.

A driving device comprises a wheel part comprising a wheel frame; a wheel driving unit, at a center of the wheel frame, configured to rotate the wheel frame; an eccentric part configured to connect a vehicle body to the wheel part; a driving part configured to be provided in the vehicle body and to drive the eccentric part; and a suspension configured to elastically connect the driving part to the eccentric part so as to damp an impact between the vehicle body and the wheel part.

These and other features and advantages are described in greater detail below.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
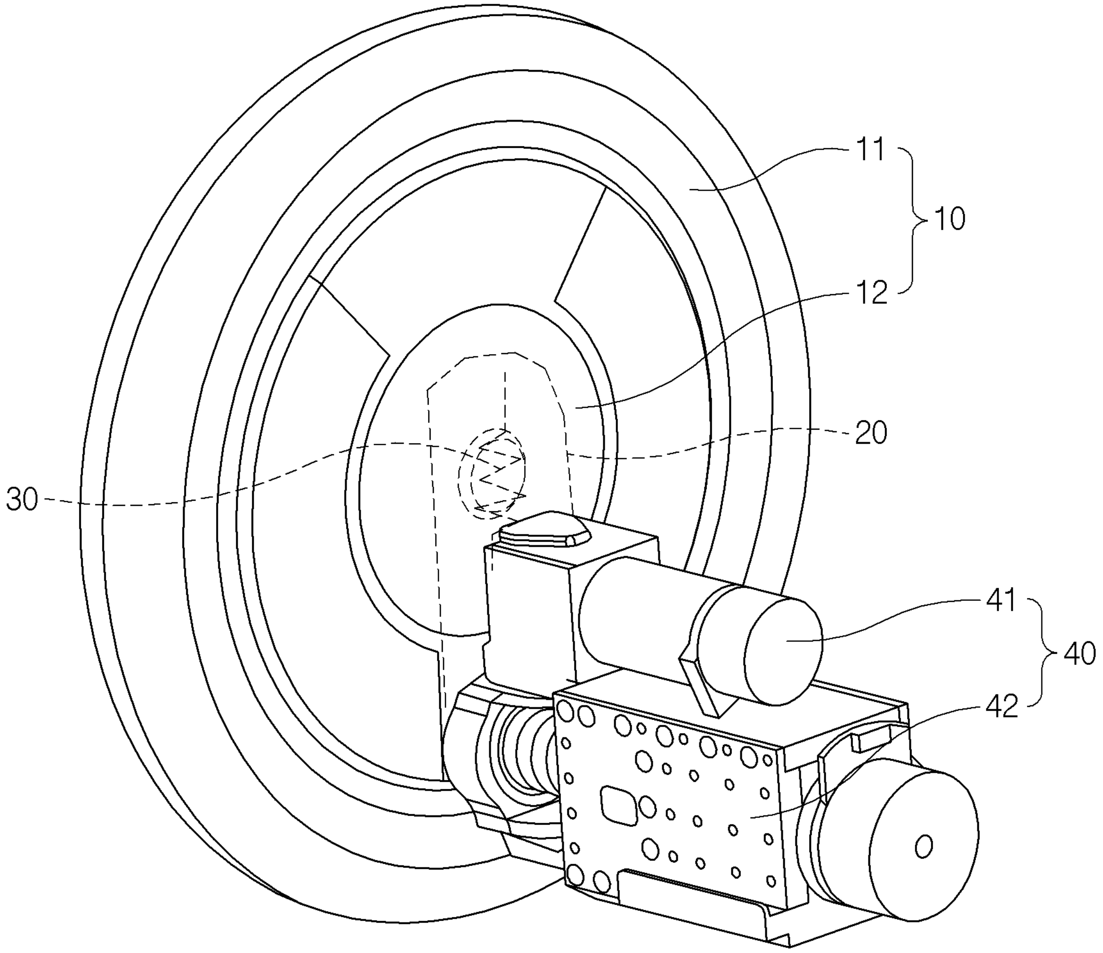
FIG. 1 illustrates a schematic view of a driving device according to the present disclosure.

Hereinafter, examples of the present disclosure will be described in detail so that an ordinary person in the art, to which the present disclosure pertains, may easily carry out the present disclosure. A detailed description of known functions and/or configurations will be omitted from the following descriptions of examples of the disclosure, so as to make the essence of the present disclosure clear.

The same or similar components will be denoted by the same or similar reference numerals throughout the specification. A component included in one example and a similar and/or corresponding component in another example will be described using the same name and/or reference numeral. The terms or wordings used in the specification and the claims should not be construed as being limited to common or lexical meanings, and should be construed as meanings and concepts that agree with the technical spirits of the present disclosure.

Furthermore, the present disclosure does not limit the examples described herein. Various modifications and/or substitutions may be made by an ordinary person in the art, to which the present disclosure pertains, without departing from the spirit of the present disclosure. The present disclosure should not be restricted by the examples described herein. All equivalents and/or equivalent modifications to the claims, as well as the claims, fall within the scope of the present disclosure.

A driving device is provided to help a suspension system cope with variable and/or varying external factors, such as an environment of a ground surface.

FIG. 1 illustrates a schematic view of a driving device according to the present disclosure.

Referring to FIG. 1, a driving device according to the present disclosure may include a wheel part 10, an eccentric part 20, a suspension 30, and a driving part 40.

The wheel part 10 may include a wheel frame 11 and a wheel driving unit 12.

The wheel frame 11, for example, may have a shape of a circular frame, and the wheel frame 11 may define and/or comprise a frame of a wheel such that a tire and/or the like may be mounted thereon. The wheel driving unit 12 may be disposed at a center of the wheel frame 11. The wheel driving unit 12 may be coupled to the wheel frame 11 so as to be configured to rotate the wheel frame 11. The wheel driving unit 12 may, for example, include a driving motor that rotates the wheel frame 11.

The eccentric part 20 may be coupled to the wheel part 10. The eccentric part 20 may, for example, be coupled to the wheel driving unit 12. The eccentric part 20 may be configured to connect the wheel part 10 and the vehicle body. In more detail, the eccentric part 20 may connect the driving part 40, which may be coupled, and/or configured to couple, to the vehicle body and the wheel part 10. The eccentric part 20 may be coupled to the wheel driving unit 12 and the driving part 40 to connect the wheel driving unit 12 and the driving part 40. The eccentric part 20 may be rotatable about the wheel part 10 with respect to a center of the wheel part 10. The eccentric part 20 may be configured to receive power via the driving part 40 to be driven.

As the eccentric part 20 is rotated about the wheel part 10, a relative location of the wheel part 10 to the vehicle body may be controlled. For example, as the eccentric part 20 is rotated, a distance between the wheel part 10 and the vehicle body may be changed whereby a height of the vehicle body (e.g., relative to a rotation center of the wheel part 10 and/or the ground) may be controlled.

The suspension 30 may be configured to provide an elastic force to damp an impact between the vehicle body and the wheel part 10. The suspension 30 of the driving device 1 according to an example of the present disclosure may be disposed in the eccentric part 20. The suspension 30 may also or alternatively be coupled to the eccentric part 20. The suspension 30 may be coupled to the wheel part 10 and the eccentric part 20 so as to provide an elastic force between the eccentric part 20 and the wheel part 10. The suspension 30 may include a spring-damper (e.g., spring-mass-damper) system, in which a spring and a damper are connected in parallel to an object having a preset mass. The suspension 30 may be configured to absorb an impact applied along a lengthwise direction thereof.

The driving part 40 may be connected to the eccentric part 20. The driving part 40 may deliver power to the eccentric part 20 to drive the eccentric part 20. The driving part 40 may control steering of the wheel part 10. The driving part 40 may include a steering unit 41 and/or an eccentric driving unit 42. The steering unit 41 may be driven (e.g., by the eccentric driving unit) to control the steering of the wheel part 10. The eccentric driving unit 42 may be connected to the eccentric part 20 so as to be able to control driving of the eccentric part 20. The eccentric driving unit 42 may be connected to an eccentric center 21 of the eccentric part 20. The steering unit 41 and the eccentric driving unit 42 may be driven independently, and thus, the steering of the wheel part 10 and the driving of the eccentric part 20 may be controlled independently.

Figure 2A:
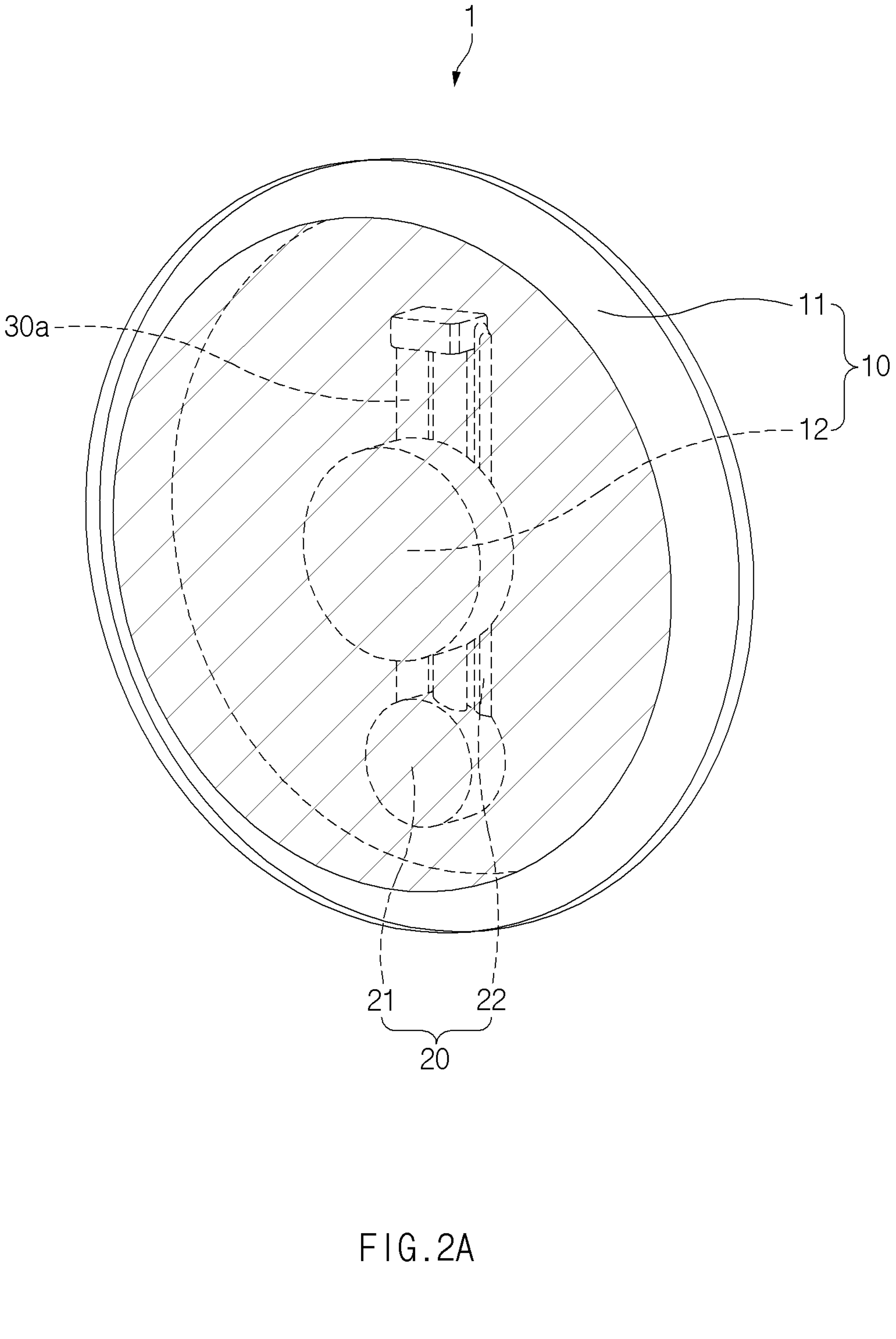
FIGS. 2A and 2B illustrate schematic perspective views of a driving device according to an example of the present disclosure, in which a suspension is coupled along a lengthwise direction of an eccentric link.
Figure 2B:
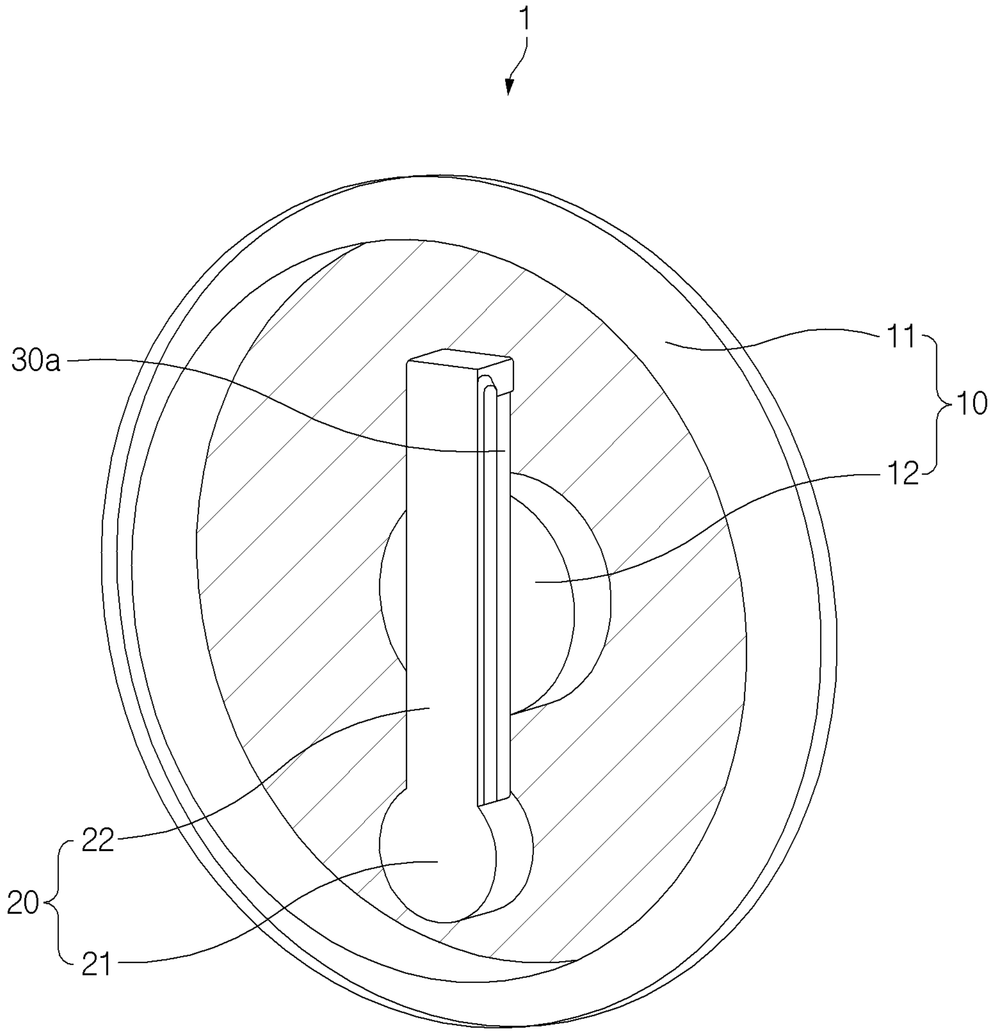

FIGS. 2A and 2B illustrate schematic perspective views of the driving device according to an example of the present disclosure, in which a suspension 30*a* is coupled along a lengthwise direction of an eccentric link 22.

Referring to FIGS. 2A and 2B, the eccentric part 20 of the driving device 1 according to an example of the present disclosure may include the eccentric center 21 and the eccentric link 22. The eccentric link 22 may extend from the eccentric center 21, and may be rotatable about a rotation axis of the wheel frame 11. The eccentric center 21 and the eccentric link 22 may be integrally formed. The eccentric link 22 may be configured to extend in a direction towards a center of the wheel frame 11 from the eccentric center 21 (e.g., radially to the wheel frame 11). The eccentric link 22 may be rotatable about and/or relative to the eccentric center 21. The above-described eccentric driving unit 42 of the driving part 40 may be connected to the eccentric center 21, and may rotate the eccentric link 22. The eccentric link 22 may be rotatable about the rotation axis of the wheel part 10.

The suspension 30*a* may be configured to be coupled to the eccentric part 20. The suspension 30*a*, for example, may be coupled to the eccentric link 22. The suspension 30*a* may be coupled to the eccentric link 22 along a lengthwise direction of the eccentric link 22. If the eccentric link 22 is rotated about the rotation axis of the wheel part 10, the suspension 30*a* may be rotated together with the eccentric link 22. The suspension 30*a* may be connected to the wheel driving unit 12. The wheel driving unit 12 may be coupled to a central portion in a lengthwise direction of the suspension 30*a*. The suspension 30*a* may elastically support the wheel driving unit 12 disposed at the center of the wheel frame 11.

Figure 3:
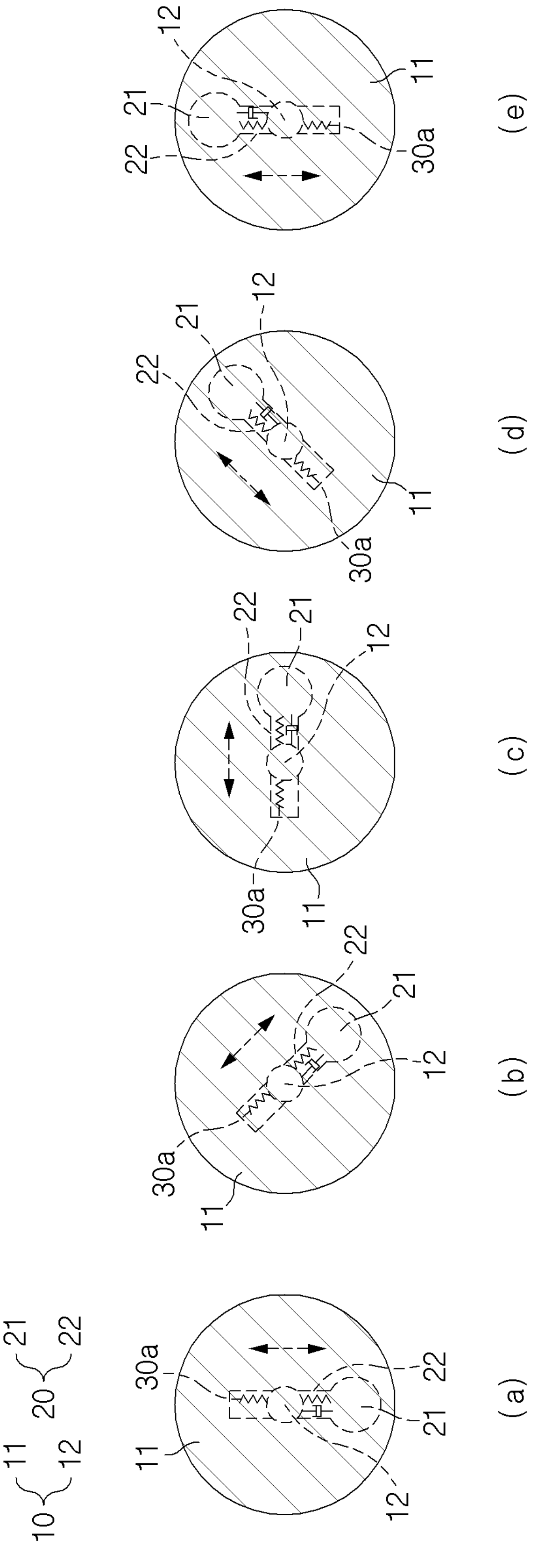
FIG. 3 is a plan view illustrating a wheel part, and an eccentric part that is rotated about a rotation axis of a wheel part.

FIG. 3 is a plan view illustrating the wheel part 10, and the eccentric part 20 that is rotated about the wheel part.

Referring to FIG. 3, the eccentric link 22 of the eccentric part 20 may be rotatable about the rotation axis of the wheel frame 11. As the eccentric link 22 is rotated, a relative location of the eccentric link 22 to the wheel frame 11 may be changed. Accordingly, a height of the vehicle body with respect to the wheel may be controlled. Also, if a vehicle has four wheels, a value of a wheel base (a distance between an axle of front wheel and an axle of rear wheel) also may be controlled.

As described above, the suspension 30*a* may be coupled to the eccentric part 20, and may be coupled to the eccentric link 22 of the eccentric part 20 along a lengthwise direction of the eccentric link 22 to be rotated together with the eccentric link 22 if the eccentric link 22 is rotated about the rotation axis of the wheel frame 11.

If an impact (for example, an impact due to driving on a curved road surface) is applied to the wheel part 10, the eccentric part 20 may be rotated with respect to the rotation axis of the wheel frame 11 at a specific angle to absorb and alleviate the impact. Through this, the impact applied to the wheel part 10, which is delivered to the vehicle body, may be significantly alleviated. For the alleviation of the impact, the rotated eccentric part 20 may return to an original location again. The absorption of the impact due to the rotation of the eccentric part 20 and the absorption of the impact due to the suspension 30*a* may be made independently, and if necessary, may be made simultaneously such that the impact may be complexly damped.

Referring to FIGS. 3A and 3E, the eccentric link 22 of the eccentric part 20 may be positioned in the vertical direction. Then, the eccentric center 21 may be positioned on a lower side of the wheel driving unit 12 and be located to be closest to a ground surface, or may be positioned on an upper side of the wheel driving unit 12 and be located to be farthest from the ground surface. If the eccentric center 21 is disposed below the wheel driving unit 12 and be maintained to be closest to the ground surface, energy that is consumed for maintaining the eccentric part 20 at a corresponding angle may be minimized.

If the eccentric link 22 is positioned in the vertical direction, the suspension 30*a* coupled to the eccentric link 22 along the lengthwise direction of the eccentric link 22 also may be positioned in the vertical direction. The suspension 30*a* positioned in the vertical direction may efficiently absorb the impact (for example, the impact due to an roughness, bump, and/or change in slope and/or texture of the road surface) in the upward/downward direction, which is applied to the wheel part 10. If the impact (e.g., the impact generated due to a collision with front and/or rear structures of the wheel) in a forward/rearward direction is applied, the impact may be damped via free rotation of the eccentric part 20.

Referring to FIGS. 3B to 3D, the eccentric link 22 may be disposed not entirely in the vertical direction, but may form a non-straight (e.g., preset or predetermined) angle with respect to the vertical direction. In this case, the suspension 30*a* coupled along the eccentric link 22 may absorb the impact in the forward/rearward direction, as well as the impact in the upward/downward direction, among the angle of the eccentric link 22. Then, the absorption of the impact due to the rotation of the eccentric link 22 may be made at the same time.

Figure 4A:
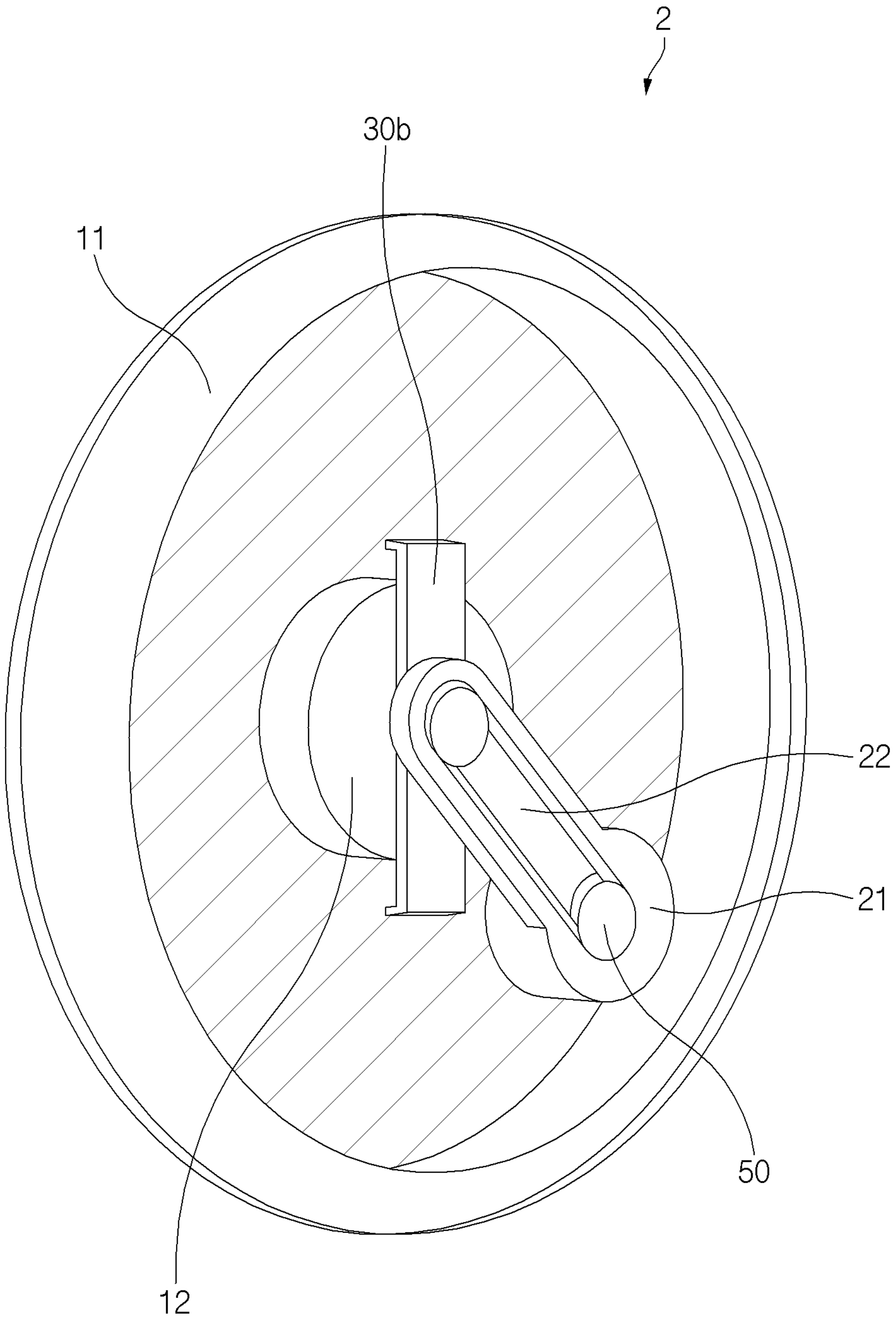
FIGS. 4A and 4B illustrate schematic perspective views of a driving device according to an example of the present disclosure, in which a suspension is positioned in a vertical direction.
Figure 4B:
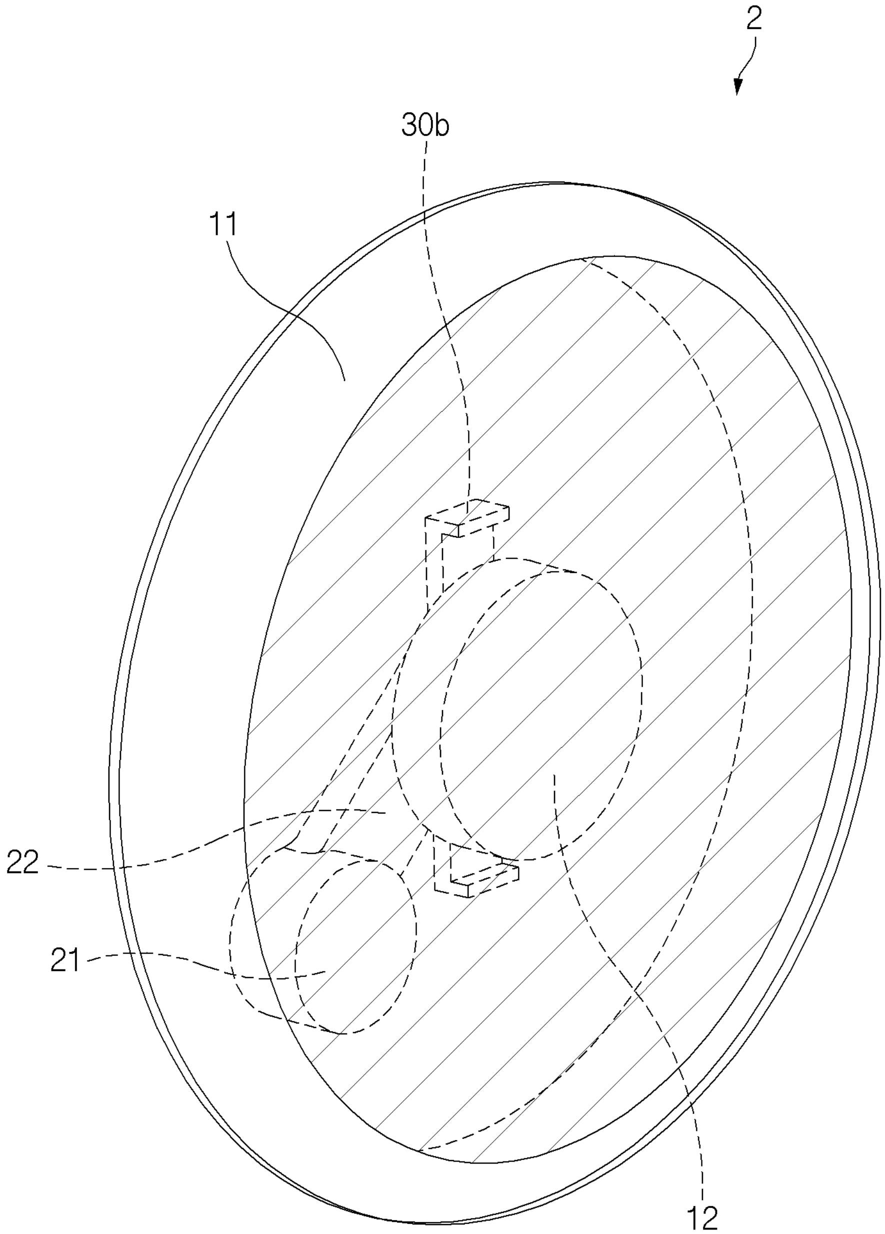

FIGS. 4A and 4B illustrate schematic perspective views of a driving device according to an example of the present disclosure.

Referring to FIGS. 4A and 4B, the driving device according to the an example of the present disclosure may further include a connector 50. The suspension 30*b* may be configured to be maintained in the vertical direction. In other words, by employing a configuration of the connector 50, the suspension 30*b* of the driving device according to an example of the present disclosure may be coupled to the eccentric part 20 and be maintained in the vertical direction.

The connector 50 may be a belt pulley structure that connects the eccentric link 22 and the suspension 30*b* such that the suspension 30*b* is maintained in the vertical direction even if the relative angle of the eccentric link 22 is changed due to the rotation of the eccentric part 20. Furthermore, the connector 50 may be a gear structure configured to perform the similar function to that of the belt-pulley structure and/or a 4-bar-linkage structure (e.g., to restrict a direction of the suspension 30*b* to the vertical direction). However, the configuration of the connector 50 is not restricted to the above-described configuration.

Figure 5:
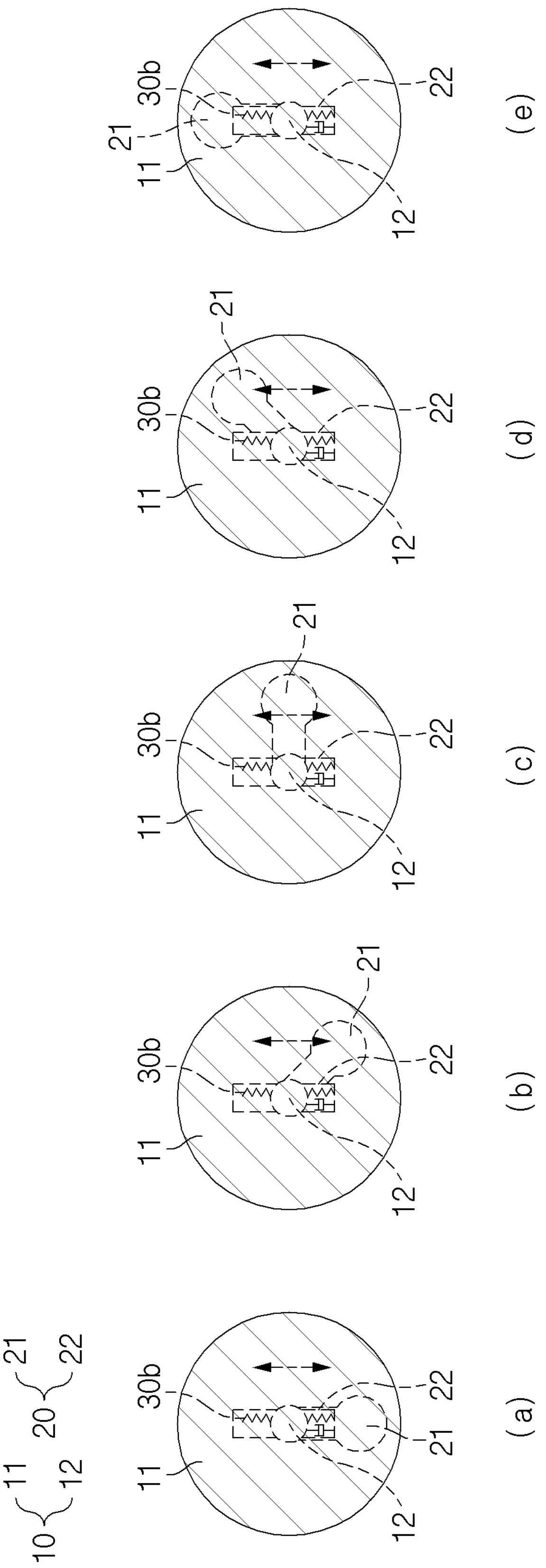
FIG. 5 is a plan view illustrating a suspension that is vertically coupled to an eccentric link rotated about a rotation axis of a wheel frame, and a wheel driving unit.

FIG. 5 is a plan view illustrating the eccentric link 22 that is rotatable about the rotation axis of the wheel frame 11 and the suspension 30*b* that is coupled to the wheel driving unit 12 vertically.

Referring to FIGS. 5A to 5E, the eccentric link 22 of the eccentric part 20 may be rotatable about the rotation axis of the wheel frame 11. As the eccentric link 22 is rotated, the relative location of the eccentric link 22 to the wheel frame 11 may be changed.

The suspension 30*b* may be positioned in the vertical direction. The suspension 30*b* may be coupled to the wheel driving unit 12 disposed at a center of the wheel frame 11 to elastically support the wheel part 10.

Even if the eccentric link 22 is rotated about the rotation axis of the wheel frame 11, a direction of the suspension 30*b* may be maintained vertically. In this case, regardless of a rotation angle of the eccentric link 22, the suspension 30*b* may function to absorb the impact in the upward/downward direction, which is applied to the wheel part 10.

If an impact is applied from an outside to the wheel part 10, the eccentric part 20 may be rotatable about the rotation axis of the wheel frame 11 by a specific angle so as to absorb and alleviate the impact. The absorption of the impact due to the suspension 30*b* and the absorption of the impact due to the rotation of the eccentric part 20 may be made simultaneously according to a direction of the applied impact and a state of a road surface.

Figure 6:
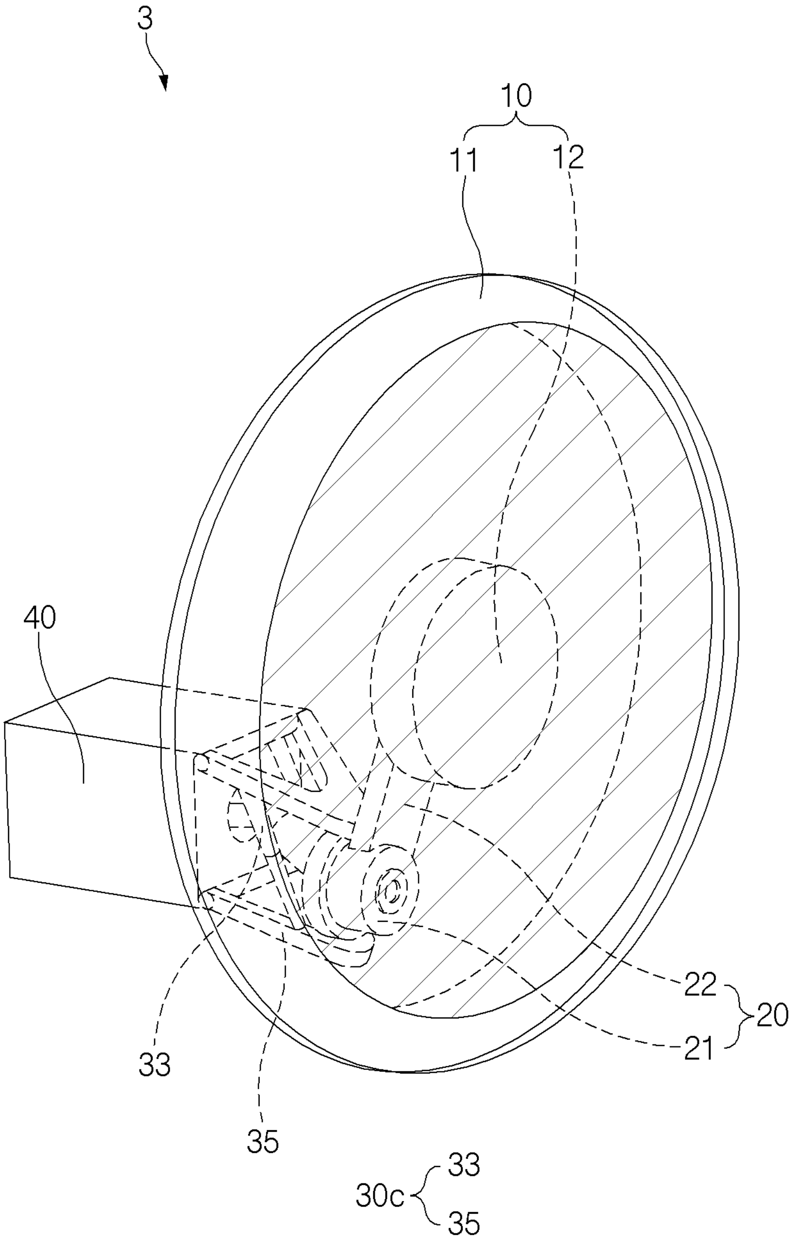
FIG. 6 illustrates a schematic perspective view of a driving device according to an example of the present disclosure, in which a driving part and a suspension are coupled.

FIG. 6 illustrates a schematic perspective view of a driving device according to another (a third) example of the present disclosure, to which the driving part 40 and the suspension 30*c* are coupled.

Referring to FIG. 6, a suspension 30*c* of the driving device according to the another (third) example of the present disclosure may be coupled to the driving part 40. As described above, the driving part 40 may be provided in the vehicle body to drive the eccentric part 20 and control steering of the wheel part 10.

If the eccentric part 20 is driven by the driving part 40, the eccentric link 22 may be rotatable about the rotation axis of the wheel frame 11.

the suspension 30*c* may be disposed between the driving part 40 and the eccentric part 20 so as to connect the driving part 40 to the eccentric part 20. The suspension 30*c* may be coupled to the driving part 40 and the eccentric center 21 to elastically damp an impact between the vehicle body and the wheel part 10.

The suspension 30*c* may include a shock absorber 33 and/or a suspension link 35.

The shock absorber 33 may be configured such that a length thereof is elastically changed in correspondence to (e.g., based on, in response to, etc.) the impact. The shock absorber 33, for example, may include the above-described spring-damper system. The shock absorber 33 may elastically connect the driving part 40*a* to the eccentric part 20. If an impact is applied from to the vehicle body and/or the wheel part 10 (e.g., such that a relative location of the driving part 40 to the eccentric part 20 is changed), the length of the shock absorber 33 may be elastically changed correspondingly.

Whether or not the eccentric link 22 is rotated about the rotation axis of the wheel frame 11, an angle of the shock absorber 33 with respect to the rotation axis of the wheel may not be changed. For example, the shock absorber 33 may be positioned in the vertical direction with respect to the rotation axis, and thus, the shock absorber 33 may function to damp the impact applied to the wheel in the vertical direction.

The suspension link 35 may be configured to surround the shock absorber 33. The suspension link 35 may be coupled to the shock absorber 33. If the length of the shock absorber 33 that absorbs the impact is elastically changed, a shape of the suspension link 35 may be changed in correspondence to the change in the length of the shock absorber 33. The suspension link 35, for example, may have a double wishbone structure, in which an arm that is bifurcated to a pair of "V" or "Y" shapes is formed therebelow. Shapes of the pair of arms formed in the suspension link 25 may be changed if the arms are inclined in correspondence to the change in the length of the shock absorber 33. The eccentric center 21 of the eccentric part 20 may be coupled to one side end of the suspension link 35, and an opposite side end of the suspension link 35 may be coupled to the driving part 40. A connection part between the suspension link 35 and the driving part 40 may be provided in a hinge form, and/or may be driven in one degree of freedom.

The eccentric part 20 may be coupled to the wheel driving unit 12 that is located at a central portion of the wheel frame 11. The eccentric link 22 of the eccentric part 20 may be rotatable about the rotation axis of the wheel frame 11, and if an impact is applied to the wheel part 10, the eccentric link 22 may be rotatable about the rotation axis of the wheel frame 11 by a specific angle whereby the impact may be absorbed and alleviated.

An impact may be absorbed independently via the rotation of the eccentric part 20 and the suspension 30*c*. The impact may be absorbed simultaneously (e.g., the impact may be complexly damped).

The present disclosure has been made to solve the above-mentioned problems occurring in the prior art while advantages achieved by the prior art are maintained intact.

A driving device may include an eccentric part and a suspension coupled thereto to efficiently absorb an external impact while controlling a relative location of a wheel to a vehicle body.

The technical problems to be solved by the present disclosure are not limited to the aforementioned problems, and any other technical problems not mentioned herein will be clearly understood from the following description by those skilled in the art to which the present disclosure pertains.

A driving device may comprise wheel part including a wheel frame, and a wheel driving unit disposed at a center of the wheel frame to rotate the wheel frame, an eccentric part connecting a vehicle body and the wheel part, and a suspension coupled to the wheel part and the eccentric part, and that provides an elastic force to damp an impact between the vehicle body and the wheel body, and the eccentric part may comprise an eccentric center having a rotation center being eccentric from a rotation axis of the wheel part, and an eccentric link extending from the eccentric center and being rotated about the rotation axis of the wheel frame.

A relative location of the wheel frame to the vehicle body may be controlled as the eccentric link is rotated about the rotation axis of the wheel frame.

The suspension may be coupled to the eccentric link.

The suspension may extend along a lengthwise direction of the eccentric link.

The suspension may be rotated together with the eccentric link as the eccentric link is rotated about the rotation axis of the wheel part.

The driving device may further include a connector connecting the eccentric link and the suspension such that the suspension is not rotated about the rotation axis of the wheel part if the eccentric link is rotated about the rotation axis of the wheel part.

The connector may be configured such that the suspension is maintained in a vertical direction.

The suspension may be coupled to the wheel driving unit.

The suspension may be a spring-damper structure that provides elasticity along a lengthwise direction of the suspension.

A driving device may comprise a wheel part including a wheel frame, and a wheel driving unit disposed at a center of the wheel frame to rotate the wheel frame, an eccentric part connecting a vehicle body and the wheel part, a driving part provided in the vehicle body, and coupled to the eccentric part to drive the eccentric part, and a suspension elastically connecting the driving part and the eccentric part to damp an impact between the vehicle body and the wheel part.

The suspension may include a shock absorber, a length of which is elastically changed in correspondence to a change of a relative location of the driving part to the eccentric part, and a suspension link coupled to the shock absorber, and a shape of which is changed in correspondence to a change in the length of the shock absorber.

The suspension link may be a double wishbone structure.

The driving device according to the present disclosure may include an eccentric part and a suspension coupled thereto to efficiently absorb an external impact while controlling a relative location of a wheel to a vehicle body.

In addition, effects that may be easily predicted by an ordinary person in the art, to which the present disclosure pertains, from the configurations of the examples of the present disclosure may be included.

Although the present disclosure has been described in the above description with reference to the limited examples and the drawings, the above description is simply the exemplary description of the technical spirits of the present disclosure and the prevent disclosure may be variously corrected and modified by an ordinary person in the art, to which the present disclosure pertains, while not departing from the essential characteristics of the present disclosure.

Accordingly, the examples disclosed in the present disclosure are not for limiting the technical spirits of the present disclosure but for describing them, and the range of the technical spirits of the present disclosure is not limited by the examples. The protection range of the present disclosure should be construed by the following claims, and all the technical spirits in the equivalent range thereto should be construed to be included in the range of the present disclosure.

What is claimed is:

1. A driving device comprising:
- a wheel part comprising a wheel frame;
- a wheel driving unit, at a center of the wheel frame, configured to rotate the wheel frame;
- an eccentric part configured to connect a vehicle body to the wheel part; and
- a suspension coupled to the wheel part and to the eccentric part, wherein the suspension is configured to provide an elastic force to damp an impact between the vehicle body and the wheel part, and
- wherein the eccentric part comprises:
  - an eccentric center comprising a rotation axis parallel to and eccentric from a rotation axis of the wheel part; and
  - an eccentric link extending from the eccentric center and configured to rotate about the rotation axis of the wheel part.

2. The driving device of claim 1, wherein a relative location of the wheel frame to the vehicle body is configured to be controlled by rotating the eccentric link about the rotation axis of the wheel part.

3. The driving device of claim 1, wherein the suspension is coupled to the eccentric link.

4. The driving device of claim 3, wherein the suspension extends along a lengthwise direction of the eccentric link.

5. The driving device of claim 4, wherein the suspension is configured to be rotated with the eccentric link if the eccentric link is rotated about the rotation axis of the wheel part.

6. The driving device of claim 2, further comprising:
- a connector connecting the eccentric link and the suspension, wherein the connector is configured to allow the eccentric link to rotate about the rotation axis of the wheel part without the suspension rotating about the rotation axis of the wheel part.

7. The driving device of claim 6, wherein the connector is configured to maintain the suspension in a vertical direction.

8. The driving device of claim 1, wherein the suspension is coupled to the wheel driving unit.

9. The driving device of claim 1, wherein the suspension comprises a spring-damper structure configured to provide elasticity along a lengthwise direction of the suspension.

10. A driving device comprising:
- a wheel part comprising a wheel frame;
- a wheel driving unit, at a center of the wheel frame, configured to rotate the wheel frame;
- an eccentric part configured to connect a vehicle body to the wheel part;
- a driving part configured to be provided in the vehicle body and to drive the eccentric part; and
- a suspension configured to elastically connect the driving part to the eccentric part so as to damp an impact between the vehicle body and the wheel part.

11. The driving device of claim 10, wherein the suspension comprises:

a shock absorber, wherein a length of the shock absorber is configured to elastically change based on a change of a relative location of the driving part to the eccentric part; and a suspension link coupled to the shock absorber, wherein a shape of the suspension link is configured to change based on a change in the length of the shock absorber.

12. The driving device of claim 11, wherein the suspension link comprises a double wishbone structure.

* * * * *